US012570509B2

(12) United States Patent
Flottran et al.

(10) Patent No.: US 12,570,509 B2
(45) Date of Patent: Mar. 10, 2026

(54) INDUSTRIAL TRUCK WITH DETECTION DEVICES ON THE FORKS

(71) Applicant: Jungheinrich Aktiengesellschaft, Hamburg (DE)

(72) Inventors: Dennis Flottran, Breitenfelde (DE); Carsten Schmidt, Bleckede (DE); Alexander Fürstenberg, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 471 days.

(21) Appl. No.: 17/675,238

(22) Filed: Feb. 18, 2022

(65) Prior Publication Data

US 2022/0259022 A1     Aug. 18, 2022

(30) Foreign Application Priority Data

Feb. 18, 2021     (DE) ..................... 10 2021 103 799.9

(51) Int. Cl.
*B66F 9/075* (2006.01)
*B60W 30/09* (2012.01)
*B66F 17/00* (2006.01)

(52) U.S. Cl.
CPC ........... *B66F 9/0755* (2013.01); *B60W 30/09* (2013.01); *B66F 17/003* (2013.01); *B60W 2554/00* (2020.02)

(58) Field of Classification Search
CPC . B60W 2554/00; B60W 30/09; B66F 17/003; B66F 9/063; B66F 9/0755
See application file for complete search history.

(56) References Cited

U.S. PATENT DOCUMENTS

| | | | | |
|---|---|---|---|---|
| 2007/0229238 A1* | 10/2007 | Boyles | ................. | G06T 7/0008 |
| | | | | 348/148 |
| 2010/0228428 A1* | 9/2010 | Harshbarger | ......... | B66F 17/003 |
| | | | | 701/31.4 |
| 2018/0155169 A1* | 6/2018 | Tanaka | ................. | G05D 1/0225 |
| 2019/0382252 A1* | 12/2019 | Meijer | ..................... | B66F 9/24 |

(Continued)

FOREIGN PATENT DOCUMENTS

| | | |
|---|---|---|
| DE | 102015010718 A1 | 2/2017 |
| DE | 102016120117 A1 | 4/2018 |

(Continued)

*Primary Examiner* — Matthew J. Reda
(74) *Attorney, Agent, or Firm* — Kilpatrick Townsend & Stockton LLP

(57)     ABSTRACT

An industrial truck comprising a vehicle body and a pair of fork prongs. Each of the fork prongs extends from the vehicle body towards a corresponding fork end in a longitudinal direction. The industrial truck comprises a plurality of wheels with which the industrial truck stands and moves on a driving surface in a driven and steered manner. At least one of the wheels is assigned to each of the fork prongs. The industrial truck comprises a lifting mechanism to adjust a height of the fork prongs above the driving surface. The industrial truck comprises at least one detection unit to detect objects located in surroundings of the truck within a detection region and to output corresponding data and a control unit operatively coupled to the at least one detection unit to receive and process the data output by the at least one detection unit.

15 Claims, 2 Drawing Sheets

(56)     References Cited

U.S. PATENT DOCUMENTS

| | | | | |
|---|---|---|---|---|
| 2020/0299117 A1* | 9/2020 | Sperlich | ................ | B66F 9/0755 |
| 2020/0317483 A1* | 10/2020 | Paterson, Jr. | ......... | B66F 9/0755 |
| 2020/0324972 A1* | 10/2020 | Cheng | .................. | B65G 1/0421 |
| 2021/0216073 A1* | 7/2021 | Araki | ................... | G05D 1/0094 |
| 2021/0240188 A1* | 8/2021 | Laaksonen | ............. | B62D 11/24 |
| 2022/0089420 A1* | 3/2022 | Faimali | ................... | B66F 9/143 |
| 2022/0100195 A1* | 3/2022 | Zhang | .................. | G05D 1/0225 |
| 2022/0363528 A1* | 11/2022 | Okamoto | ............. | B66F 9/0759 |

FOREIGN PATENT DOCUMENTS

| | | | | |
|---|---|---|---|---|
| DE | 102019001125 A1 | 8/2020 | | |
| DE | 102019107096 A1 | 10/2020 | | |
| DE | 102019113606 A1 | 11/2020 | | |
| DE | 102019213922 A1 | 3/2021 | | |
| EP | 3034452 A1 | 6/2016 | | |
| EP | 3251918 A1 | 12/2017 | | |
| JP | 2015170284 A | 9/2015 | | |
| KR | 20200013544 A * | 2/2020 | ................ | B66F 9/12 |

* cited by examiner

INDUSTRIAL TRUCK WITH DETECTION DEVICES ON THE FORKS

CROSS REFERENCE TO RELATED APPLICATION

This application claims priority to German Patent Application No. 10 2021 103 799.9, filed in Germany on Feb. 18, 2021, the entire contents of which are hereby incorporated herein by this reference.

The present invention relates to an industrial truck, in particular a lift truck, comprising a vehicle body, a pair of fork prongs extending from the vehicle body to a corresponding fork end in a longitudinal direction, a plurality of wheels with which the industrial truck stands on a driving surface and moves thereon in a driven and steered manner, wherein at least one of the wheels is assigned to each of the fork prongs, a lifting mechanism which is set up to adjust the height of the fork prongs above the driving surface, a plurality of detection units, each of which is set up to detect objects located in the surroundings of the industrial truck within a detection region and to output corresponding data, and a control unit which is operatively coupled to the detection units and is set up to receive and process the data output by the detection units.

In the case of automated and autonomous industrial trucks in particular, it is necessary to detect the surroundings thereof as completely as possible in order to be able to comply with the required safety standards with regard to possible collisions with moving or immobile objects. However, even in industrial trucks occupied by a driver, such monitoring devices can contribute to an increased level of safety, for example by outputting signals to the driver on the basis of the outputs thereof or by carrying out corresponding reaction operations directly autonomously by the vehicle.

In particular in industrial trucks, in which load rollers are integrated in fork prongs to take over the task of the front wheels of the vehicle, and in which the fork prongs for picking up and transporting loads are vertically displaceable by means of the lifting mechanism, it is often not possible to cover the entire surroundings of the vehicle with only two detection units and it is also not possible to completely cover the entire region in front of the vehicle, i.e. in the extension of the fork prongs in the longitudinal direction of the vehicle, using detection units provided on the vehicle body, since the already mentioned load rollers cover or shade considerable angular ranges from the point of view of the detection units, possibly resulting in dead zones that are not monitored.

On the other hand, it has been proposed in EP 3 034 452 A1, for example, to install detection units directly in the fork prong tips in corresponding industrial trucks in order to have an unrestricted view to the front. In practice, however, it has been shown that, due to the limited possible angular coverage of such detection units, monitoring gaps can also arise immediately in front of the fork prongs and these detection units are therefore primarily used as assistance systems or as unsafe detection elements, for example to be able to better detect the region in front of the fork prongs during storage processes. Furthermore, the integration of functional components in the fork prong tips is technically demanding and complex.

It is therefore the object of the present invention to develop a generic industrial truck in such a way that substantially the entire corridor in front of the fork prongs can be covered without dead zones; at the same time, a relatively inexpensive and simple integration of the detection units required for this on the industrial truck without major redesigns is made possible.

To achieve this object, in an industrial truck according to the invention, one of the detection units is assigned to each of the fork prongs, wherein the corresponding detection unit is arranged on the underside of the corresponding fork prong at a position in the longitudinal direction thereof between the wheel assigned to this fork prong or the foremost of the wheels assigned to this fork prong and the fork end, and the detection units assigned to the two fork prongs are aligned with one another in such a way that the corresponding detection regions thereof jointly substantially cover the entire corridor formed in front of the fork ends by corresponding imaginary extensions of the two fork prongs or a detection unit is assigned to one of the fork prongs, wherein the detection unit is arranged on the underside of the corresponding fork prong at a position in the longitudinal direction thereof between the wheel assigned to this fork prong or the foremost of the wheels assigned to this fork prong and the fork end, the detection unit assigned to the fork prongs is arranged and designed in such a way that its detection region substantially covers the entire corridor formed in front of the fork ends by corresponding extensions of the two fork prongs.

By arranging a detection unit on the underside of either one or both of the fork prongs at a position which prevents regions in front of the industrial truck, which regions are covered by the corresponding wheel, it is ensured that the corridor in front of the two fork prongs can be monitored substantially completely and without gaps. In particular, in embodiments in which a detection unit is provided on each of the fork prongs, an overlap of the detection regions of the at least two detection units in the region of the fork prongs before the fork end can be achieved, for example by each of the two detection units having a monitoring region of approximately 90°. In contrast, the embodiment with only one detection unit requires an enlarged monitoring region in this unit, which monitoring region could be of the order of magnitude of 150°, for example.

Thus, in the industrial truck according to the invention, complete monitoring of the region in front of the industrial truck can be ensured in a structurally simple manner. It goes without saying that, for example, in embodiments of such industrial trucks in which a plurality of wheels is provided in each of the fork prongs, for example jointly mounted pairs of wheels, the position of the corresponding detection unit in the longitudinal direction of the corresponding fork prong is in front of the foremost of these wheels.

Although the corridor monitored by the detection units can in principle extend infinitely forwards from the fork ends, it makes sense to define a specific termination criterion in this case in order to classify objects detected at a predetermined minimum distance from the vehicle as no longer problematic. For this purpose, in the case of detection units with the ability to determine distances in two dimensions, for example, control software can be provided for this purpose or, in the case of sensors with an intrinsically limited range, the minimum distance can also already be defined by them. A benchmark for the minimum distance can be formed by the braking distance of the industrial truck, which ensures that if an object occurs in the monitored corridor, the industrial truck can always be fully braked before a collision occurs. Furthermore, in some embodiments, the corridor to be monitored cannot begin immediately in front of the fork prongs, but at a small distance therefrom, whereby the safety effect of the monitoring would only be slightly impaired.

Although, as mentioned, the industrial truck according to the invention can be operated automatically or autonomously and the data supplied by the detection units can make a valuable contribution to the detection of the surroundings of the industrial truck, the industrial truck according to the invention can, however, also be operated or remotely controlled by a human driver, in which case the detection units can then fulfil a supplementary safety purpose.

In such types of industrial trucks, the vehicle body is often referred to as the drive part, since it accommodates all of the components necessary for the movement of the industrial truck, for example a traction motor, a steering device, and an energy store, such as an accumulator.

In a further development of the industrial truck according to the invention, at least one of the detection units can also be assigned to this vehicle body, wherein, in particular in embodiments in which at least two of the detection units are assigned to the vehicle body, and in each case one of them is aligned with one of the detection units assigned to the fork prongs in such a way that the corresponding detection regions thereof jointly cover at least the entire region on one side of the industrial truck, the entire region on at least one of the sides of the industrial truck can also be monitored in addition to the corridor in front of the fork prongs.

In particular, the detection units assigned to the vehicle body and the detection units assigned to the fork prongs can be arranged in such a way that the corresponding detection regions thereof jointly substantially cover the entire space outside the outline of the industrial truck, i.e. in particular monitoring behind the industrial truck is also made possible in relation to its longitudinal direction, so that a trip in one direction opposite to the extension of the fork prongs can take place with increased safety.

In embodiments in which one of the detection units is assigned to each of the fork prongs, the detection units can, as mentioned, be aligned with one another in such a way that the corresponding detection regions thereof jointly form an overlap in front of the two fork prongs. This overlap increases the safety and redundancy of the industrial truck and can thus make a contribution to an increased safety classification thereof.

Although the way of mounting the detection units on the fork prongs is initially completely free and can be matched to the specific design and dimensions of the fork prongs and the detection units, as long as correct positioning and alignment thereof is made possible, in one embodiment, the detection units assigned to the fork prongs can be connected to the fork prongs by means of substantially vertically extending attachment units.

Furthermore, different types of detection units can be used as long as they can achieve sufficient spatial coverage; in particular, however, known and freely available laser scanners or ultrasonic sensors can be used for this purpose, for example ESPE laser scanners having a plurality of laser diodes which can monitor a wide detection region.

In order to be able to ensure adequate protection of the at least one detection unit from collisions with objects possibly located on the driving surface, the fork prongs in the region of this at least one detection unit can also be formed with side walls extending down over the detection units and/or are formed in a tapered manner in the longitudinal direction. It is important to ensure that the corresponding monitoring regions of the individual detection units remain accessible and are not covered or impaired by these side walls.

In particular, for this purpose, the fork prongs, in the longitudinal direction in front of the at least one detection unit, can be provided with side walls extending less far down than in the region of the at least one detection unit or be free of such side walls in order to ensure a clear view of the at least one detection unit. In order to achieve optimal protection of the at least one detection unit while at the same time not restricting the field of view thereof, the contour of the downwardly extending side walls can substantially correspond to the contour of the detection region of the at least one detection unit.

Although the coupling between the at least one detection unit and the control unit could be established by means of any known techniques, for example also by means of wireless transmission, this coupling can also be established in one embodiment by means of a bus system. This bus system can be integrated in the industrial truck specifically for this purpose, or a bus system which is provided in any case for the exchange of data between individual components in the vehicle can be used.

In a similar way, the control unit can be integrated in a higher-level control unit of the industrial truck or formed by this or, in an alternative embodiment, can be designed as a separate component and be operatively coupled to the higher-level control unit.

Finally, the control unit can also be set up to determine an operating mode of the industrial truck on the basis of the data received from the detection units, for example to only allow an increased travel speed of the vehicle if the evaluation of the data supplied by the detection units has shown that in a predetermined region around the industrial truck and in particular in the direction of travel in front of it, there are no objects to be classified as problematic.

Further features and advantages of the present invention will become clear from the following description of one embodiment thereof when this is considered together with the accompanying drawings. In detail, in the drawings.

Figure 1:
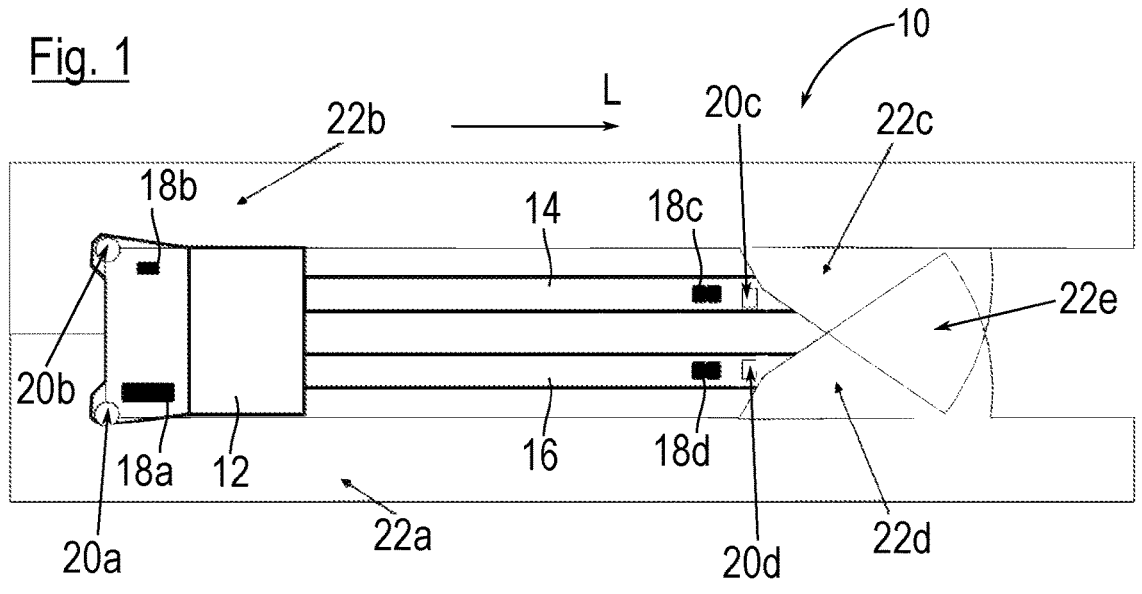
FIG. 1 is a schematic plan view of an industrial truck according to the invention with indicated monitoring regions of a plurality of detection units.

In FIG. 1, an industrial truck according to the invention is shown purely schematically in a plan view and denoted by the reference sign 10.

The industrial truck 10 substantially corresponds to a known type of an autonomously operated lift truck and comprises a vehicle body 12 and a pair of fork prongs 14 and 16 extending from the vehicle body 12 to a corresponding fork end 14a, 16a in a longitudinal direction L, which fork prongs are vertically displaceable by means of a lifting mechanism (not shown) for picking up loads.

In the embodiment shown, a total of four wheels 18a-18d are provided on the industrial truck 10, the two wheels 18c and 18d each being assigned to one of the two fork prongs 14 and 16, while the other two wheels 18a and 18b are assigned to the vehicle body 12. Alternatively, of course, embodiments of industrial trucks according to the invention with a different configuration of wheels are also conceivable, for example with only three wheels, one of which is assigned to the vehicle body 12 and one of which is assigned to one of the fork prongs 14 and 16.

Furthermore, a total of four detection units 20a-20d with corresponding detection regions 22a-22d can be seen in FIG. 1, wherein the two detection units 20a and 20b are assigned to the vehicle body 12 in such a way that they are provided at its rear end in the longitudinal direction L on an outside thereof in order to be able to collectively cover both the entire region to the side of the industrial truck 10 and behind the industrial truck 10 with the detection regions 22a and 22b thereof.

In contrast, the two detection units 20c and 20d are each assigned to one of the fork prongs 14 and 16 and are arranged on the underside of the corresponding fork prong 14, 16 at positions in the longitudinal direction L thereof between the wheel 18c or 18d assigned to these fork prongs 14, 16 and the corresponding fork end 14a or 16a. In this way, it is achieved that the two monitoring regions 22c and 22d have an overlap 22e which already begins in the longitudinal direction L on the side of the two fork ends 14a and 14b in the direction of the vehicle body 12, so that the entire corridor 24 in front of the fork ends 14a, 16a is covered between the corresponding extension of the two fork prongs 14, 16. Together with the detection regions 22a and 22b of the two detection units 20a and 20b assigned to the vehicle body 12, monitoring of the entire space outside the outline of the industrial truck 10 is also achieved without any gaps or dead zones being created.

Figure 2:
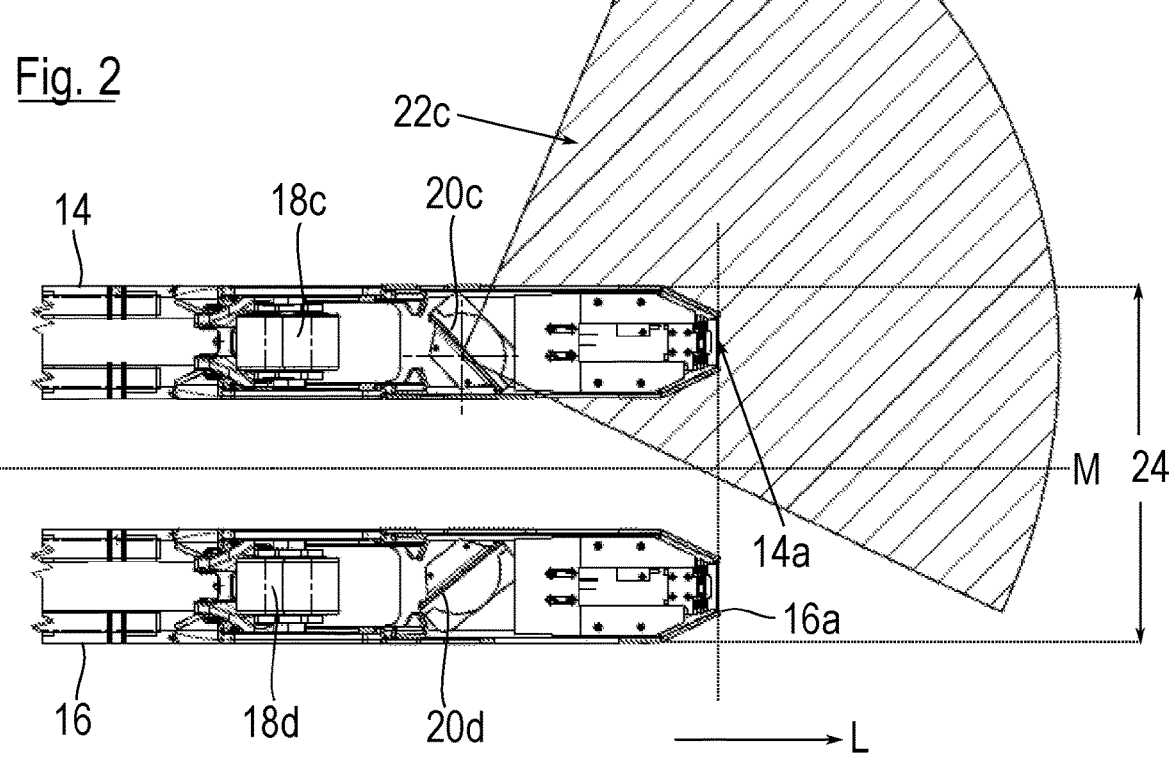
FIG. 2 is an enlarged view of the fork ends of the industrial truck from FIG. 1 in a detailed view.

To clarify the monitoring region 22c of the detection unit 20c assigned to the fork prongs 14, reference is also made to FIG. 2, in which this is shown again in an enlarged view. This shows that the detection region 22c of the detection unit 20c is approximately 90° and is oriented relative to the fork prongs 14 in such a way that the central axis M between the two fork prongs 14 and 16 is intersected by the detection region 22c before the two fork ends 14a and 16c.

Finally, reference should also be made to FIG. 3, in which the fork prongs 14 and 16 are shown obliquely from below, whereby it can be seen that the two detection units 20c and 20d are surrounded by corresponding pulled down side walls 26 extending downwards in the vertical direction over the detection units 20c and 20d and are formed in a tapered manner in the longitudinal direction L in order not to show any impairment of the detection regions 22c and 22d explained with reference to FIG. 2. In particular, the region in the longitudinal direction L in front of the detection units 20c and 20d is free of such side walls and the contour of the downwardly extending side walls substantially corresponds to the contour of the detection region of the at least one detection unit. It can also be seen that the detection units 20c and 20d are attached to the undersides of the fork prongs 14 and 16 by means of simple angle plates 28.

Figure 3:
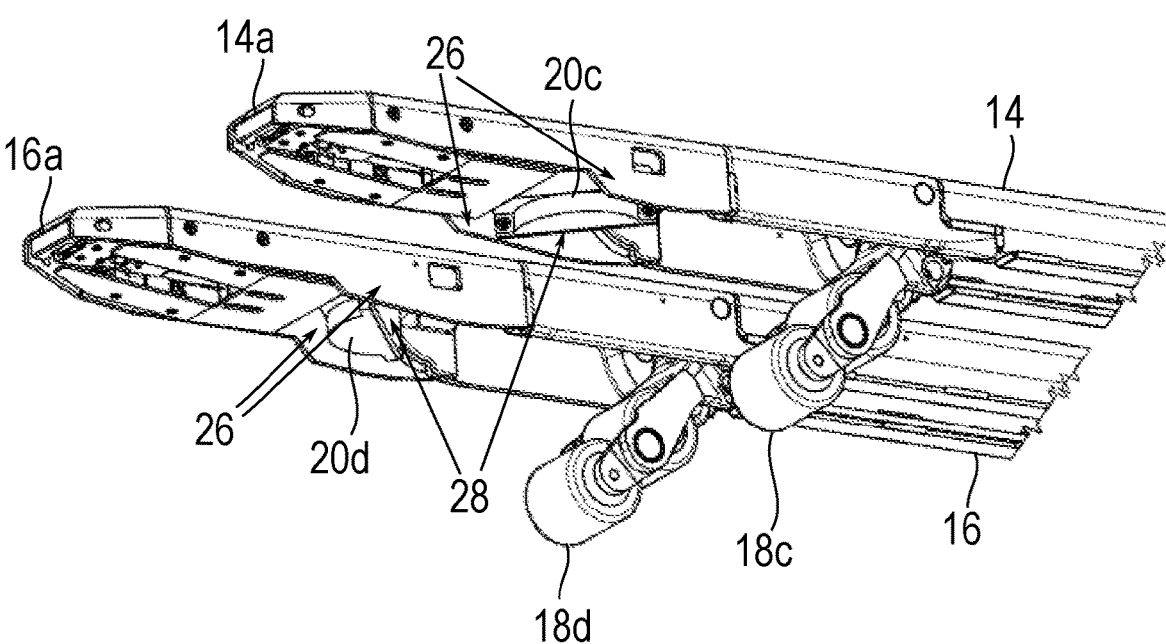
FIG. 3 is a view of the fork ends from FIG. 2 obliquely from below.

In the view from FIG. 3, it can also be seen that in the embodiment shown in this case, the two wheels 18c and 18d are each designed as a pair of wheels which ensure permanent ground contact when the fork prongs 14 and 16 are raised, but, if a detection unit was arranged in the longitudinal direction L behind them, it would create a considerable dead zone.

The invention claimed is:

1. An industrial truck, comprising:
a vehicle body;
a pair of fork prongs, each of the fork prongs extending from and in front of the vehicle body towards a corresponding fork end in a longitudinal direction;
a plurality of wheels with which the industrial truck stands and moves on a driving surface in a driven and steered manner, wherein at least a first wheel of the plurality of wheels is assigned to a first fork prong of the pair of fork prongs and at least a second wheel of the plurality of wheels is assigned to a second fork prong of the pair of fork prongs;

a lifting mechanism configured to adjust a height of the fork prongs above the driving surface;
a plurality of detection units, each detection unit configured to detect objects located in surroundings of the industrial truck within a detection region and to output corresponding data; and
a control unit operatively coupled to each detection unit and configured to receive and process the data output by each detection unit,
wherein a first detection unit of the plurality of detection units is assigned to the first fork prong and is arranged on an underside of the first fork prong at a position in the longitudinal direction of the first fork prong between the fork end of the first fork prong and the first wheel or a foremost wheel assigned to the first fork prong,
wherein a second detection unit of the plurality of detection units is assigned to the second fork prong and is arranged on an underside of the second fork prong at a position in the longitudinal direction of the second fork prong between the fork end of the second fork prong and the second wheel or a foremost wheel assigned to the second fork prong,
wherein the first detection unit and the second detection unit are aligned with one another so that a detection region of the first detection unit and a detection region of the second detection unit jointly form an overlap beginning between, behind, and underneath the fork end of the first fork prong and the fork end of the second fork prong and extending in front of the pair of fork prongs.

2. The industrial truck of claim 1, wherein each of the detection region of the first detection unit and the detection region of the second detection unit is ninety degrees (90°).

3. The industrial truck of claim 1, wherein a third detection unit of the plurality of detection units is assigned to the vehicle body.

4. The industrial truck of claim 1, wherein at least a third detection unit of the plurality of detection units is assigned to the vehicle body, and wherein the third detection unit is aligned with the first detection unit so that a detection region of the third detection unit and the detection region of the first detection unit jointly cover a region on one side of the industrial truck.

5. The industrial truck of claim 1, wherein at least a third detection unit and a fourth detection unit of the plurality of detection units are assigned to the vehicle body, and wherein the first detection unit, the third detection unit and the fourth detection unit are arranged such that the detection region of the first detection unit, a detection region of the third detection unit and a detection region of the fourth detection unit jointly and cover a space outside an outline of the industrial truck.

6. The industrial truck of claim 1, wherein the first detection unit is connected to the first fork prong by means of vertically extending attachment units.

7. The industrial truck of claim 1, wherein at least one of the plurality of detection units comprises a laser scanner.

8. The industrial truck of claim 1, wherein the first fork prong in the region of the first detection unit is formed with side walls extending down over the first detection unit and the second fork prong in the region of the second detection unit is formed with side walls extending down over the second detection unit.

9. The industrial truck of claim 1, wherein the first fork prong is provided with side walls that extend in the longitudinal direction in front of the first fork prong to a position behind the region of the first detection unit such that the detection region of the first detection unit is not impaired by the side walls.

10. The industrial truck of claim 9, wherein a contour of the longitudinally extending side walls corresponds to a contour of the detection region of the first detection unit.

11. The industrial truck of claim 1, wherein a coupling between at least one of the first detection unit or the second detection unit and the control unit is established by means of a bus system.

12. The industrial truck of claim 1, wherein the control unit is integrated in a higher-level control unit of the industrial truck.

13. The industrial truck of claim 1, wherein the control unit is configured to determine an operating mode of the industrial truck based on the data received from the plurality of detection units.

14. The industrial truck of claim 1, wherein the first fork prong in the region of the first detection unit is formed in a tapered manner in the longitudinal direction of the first fork prong and the second fork prong in the region of the second detection unit is formed in a tapered manner in the longitudinal direction of the second fork prong.

15. The industrial truck of claim 8, wherein the sides walls of the first fork prong and the sidewalls of the second fork prong are formed in a tapered manner in the longitudinal direction in order to not impair the detection region of the first detection unit and the detection region of the second detection unit.

* * * * *